Sept. 23, 1969  J. W. EHLEN  3,468,351
POWER DRIVEN CONTINUOUS CUTTING STRIP
Filed Dec. 28, 1966  2 Sheets-Sheet 1
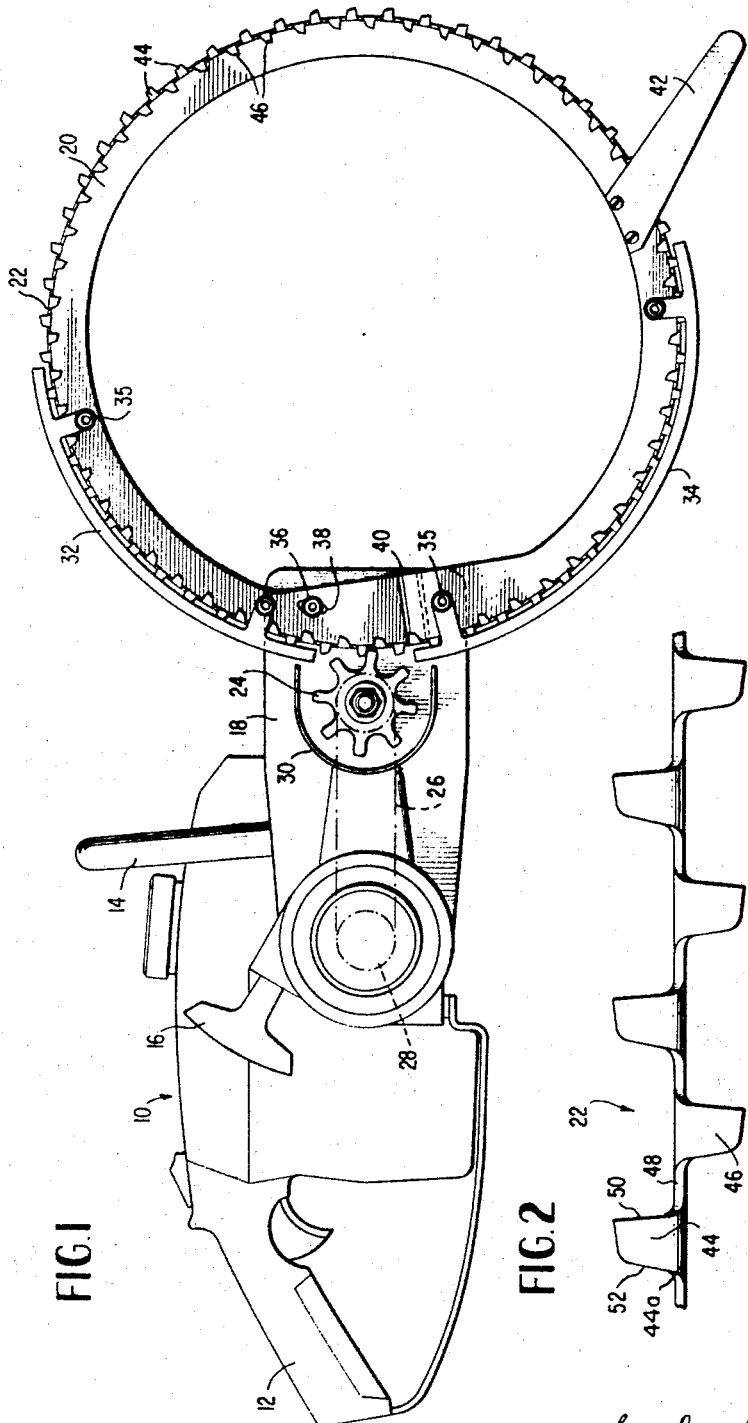
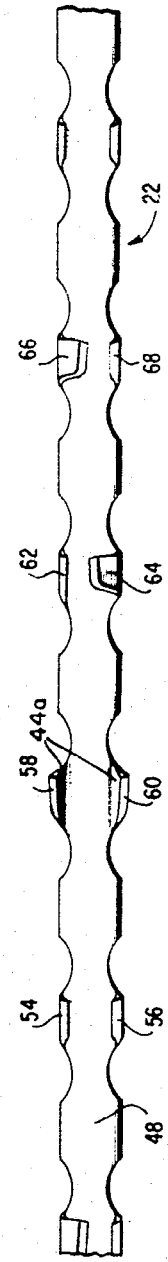
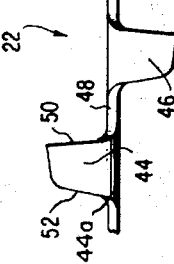
INVENTOR
JACK W. EHLEN
BY *Burns, Doane, Benedict, Swecker & Mathis*
ATTORNEYS

INVENTOR
JACK W. EHLEN

BY Burns, Doane, Benedict, Swecker & Mathis

ATTORNEYS

United States Patent Office 3,468,351
Patented Sept. 23, 1969

3,468,351
POWER DRIVEN CONTINUOUS CUTTING STRIP
Jack W. Ehlen, Torrance, Calif., assignor to McCulloch Corporation, Los Angeles, Calif., a corporation of Wisconsin
Filed Dec. 28, 1966, Ser. No. 605,371
Int. Cl. B27b 5/14, 17/08, 33/08
U.S. Cl. 143—44                                                8 Claims

ABSTRACT OF THE DISCLOSURE

A portable, power driven saw having a radially flexible continuous cutting strip driven about a rigid support defining a substantially circular and continuous travel path to prevent flexing of the cutting strip. The cutting strip is driven about the rigid support by a rotating sprocket which drivingly engages portions of the cutting strip.

CROSS-REFERENCE TO RELATED APPLICATION

While this application involves several novel concepts, it is related in part to the subject matter of United States Patent 3,338,275 filed Sept. 27, 1965.

BACKGROUND OF THE INVENTION

The previously mentioned United States Patent 3,338,-275 discloses a portable power saw comprising a continuous cutting strip which is driven by a driving wheel about the periphery of an elongated support member having a curved end. The driving member is driven by the power motor and is disposed inside the periphery of the continuous cutting strip to drivingly contact portions of the cutting strip.

A power saw constructed in accordance with United States Patent 3,338,275 has been found to provide substantial advantages over a conventional chain saw. For instance, the relatively flexible, continuous cutting strips may be very economically manufactured, as by stamping, and may thus be thrown away when dull rather than necessitating removal and sharpening. Because of the low inertia resulting from the light weight of the continuous cutting strip, such a portable power saw may be virtually instantaneously stopped, thus allowing for ease of operation and reducing the hammering often created by conventional chain saws. Further, the continuous cutting strip does not tend to carry a substantial amount of foreign material between the cutting teeth during a cutting operation, and the strip does not then significantly stretch. Because of its continuous smooth base surface, the continuous strip is easily installable or repaired, and provides a smooth outward flow of chips during a cutting operation.

While a power saw constructed in accordance with the previously mentioned United States Patent 3,338,275 provides excellent cutting characteristics in many respects, it has been found that the continuous cutting strip of such saws is sometimes subjected to wear due to the flexing imposed upon the strip by the elongated curved support member.

Additionally, since in such saws the driving member is disposed inside the periphery of the continuous cutting strip, it has been found that the continuous strip sometimes tends to move away from the driving member upon the occurrence of substantial cutting forces. The driving member also sometimes tends to bend or kink the continuous cutting strip if the strip becomes bound or locked into the material being cut.

OBJECTS OF INVENTION

Accordingly, a general object of the present invention is the provision of a method and apparatus for cutting which minimizes or substantially eliminates disadvantages heretofore present in power saw cutting.

A more specific object is the provision of a portable power saw wherein flexing of the cutting member is substantially eliminated.

A further object of the present invention is the provision of a cutting device wherein the drive maintains driving contact with the cutting member even during the application of substantial cutting stresses.

Yet a further object of the present invention is the provision of an improved cutting device having a very lightweight and economical, yet efficient, continuous cutting member.

It is a still further object of the present invention to provide a cutting device which does not tend to retain or carry substantial amounts of foreign material between the cutting teeth during cutting to reduce stretching of the cutting device.

Another object of the present invention is to provide a continuous cutting device having an interrupted surface to provide a smooth outward flow of chips during a cutting operation.

Yet another object of the present invention is to provide an easily installable cutting member which does not tend to kink.

It is a further object of the invention to provide a cutting member wherein the individual cutting elements are integral with the cutting member in order to eliminate rear-back and to substantially eliminate twisting of portions of the cutting member.

It is a still further object of the present invention to provide a cutting device which may be virtually instantaneously stopped because of relatively low inertia.

Another object of the present invention is to provide a cutting device which due to low frictional losses does not generate a substantial amount of heat.

A still further object of the present invention is the provision of a cutting device wherein the tension of the rotating cutting member may be selectively adjusted.

SUMMARY OF THE INVENTION

In achieving these and other objects which will be apparent hereinafter, one aspect or the present invention provides a support defining a substantially circular and continuous travel path, with a radially flexible continuous cutting strip rotatably disposed in the travel path. The cutting strip may include a plurality of integral cutting teeth bent transversely. Driving means rotates the cutting strip through the substantially circular travel path.

Another aspect of the present invention provides a flexible cutting strip having a generally flat base portion with a plurality of transversely spaced cutting teeth pairs intergrally inclined from the base portion.

Another important aspect of the present invention comprises a method of cutting wherein a radially flexible continuous cutting strip is supported and driven about a continuous circular travel path to prevent flexing of the cutting strip.

THE DRAWINGS

The invention and its many advantages may be further understood by reference to the following detailed description illustrated in the accompanying drawings, in which:

FIGURE 1 is a side view of a portable power saw constructed in accordance with the present invention;

FIGURE 2 is a side view of a preferred embodiment of a portion of the cutting strip of the present invention;

FIGURE 3 is a top view of a preferred embodiment of another portion of the cutting strip of the present invention;

DETAILED DESCRIPTION OF THE INVENTION

Figure 4:
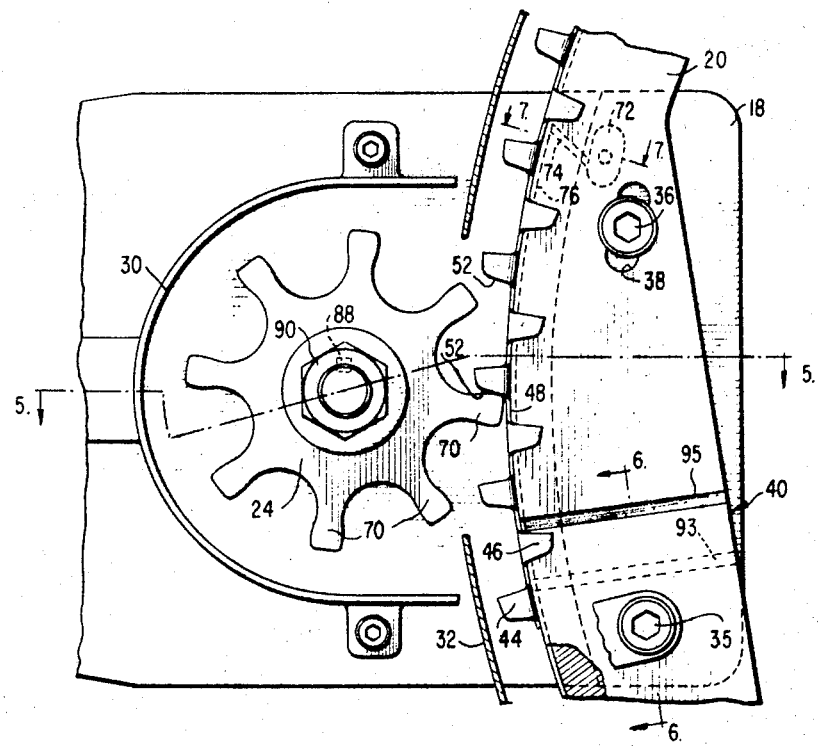
FIGURE 4 is a detailed side view of the cutting strip driving portion of the present invention.

Referring to FIG. 1, a portable saw constructed in accordance with the present invention is powered by a conventional gasoline motor designated generally at 10 and having a pair of handles 12 and 14. The gasoline motor 10 may be conventionally started by manual operation of the starter 16.

Rigidly connected to a support extension 18 is a hollow circular support member 20 which defines a substantially circular and continuous travel path for a continuous cutting strip 22. The cutting strip 22 is constructed from relatively thin metal to be radially flexible and is thus incapable of withstanding the forces of cutting without the support member 20. The support member 20 may be made from 7075 ST heat treated aluminum about .141 inch thick. In the preferred embodiment, an outer diameter of about 11.46 inches for the support member 20 has been advantageously untilized. The cutting strip 22 is driven about the support member 20 by a drive sprocket wheel 24 which is disposed outside the periphery of the strip 22 and is rotated by a suitable drive belt 26. The gasoline engine 10 powers a driving shaft 28 which in turn rotates the drive sprocket wheel 24 through drive belt or chain 26.

A shield member 30 is provided to protect the saw operator from the rotating drive sprocket wheel 24. Guard members 32 and 34 are rigidly connected to the support member 20 by suitable fastening screws 35 in order to shield the cutting edges of the rotating cutting strip 22. An adusting screw 36 is disposed through an elongated slot 38 to connect one end of the circular support member 20 to the extension 18. By adustment of the position of screw 36 in slot 38, the magnitude of the generally circular travel path provided by the outer periphery of the support member 20 may be varied to allow selective adustment of the tension of the rotating continuous cutting strip 22. The support member 20 is provided with an expandable joint 40, to be later described in more detail, to allow such adustment while maintaining a continuous travel path. An outwardly extending bumper 42 may be suitably connected to the support member 20 to provide a stop or pivot point about which the cutting device may travel during a cutting operation.

The continuous cutting strip 22 includes a plurality of integral cutting teeth 44 for performing efficient cutting operations, as will be later more fully described. Additionally, the cutting strip 22 includes a plurality of spaced apart integral guide members 46 for encompassing a portion of the outer periphery of the circular support member 20 in order to constrain the cutting strip 22 to follow the substantially circular travel path and prevent flexing of the strip. It has been found that significantly longer wear and lower frictional losses are provided by this aspect of the present invention.

FIGURE 2 discloses in detail a portion of a preferred embodiment of the present cutting strip 22. Each of the cutting teeth 44 have identical cross-sectional configurations and are integrally connected with a relatively flat base portion 48. The cutting teeth 44 are bent transversely of the base portion 48 at predetermined inclinations. Each cutting tooth 44 includes a sharpened cutting surface 50 which may be slightly backwardly inclined in a trailing manner. It will be understood, however, that the cutting surface 50 could be positioned either at a right angle with the base portion 48, in a forwardly inclined leading position, or in combinations of all three positions. As will be later described in greater detail, a driving surface 52 is also provided for each of the cutting teeth 44 to enable the flexible cutting strip 22 to be driven by the rotating drive sprocket 24.

The guide members 46 integrally connected to the flat base 48 are constructed with an identical cross-sectional configuration as the cutting teeth 44. This identical construction of both the cutting teeth and guide members enables the present device to be easily manufactured, as by stamping from a single piece of metal. The guide members 46 are transversely disposed in pairs along the flat base 48, with each pair being bent radially inwardly from the base 48 to define a space encompassing a portion of the outer periphery of the support member 20 to constrain the cutting strip 22 to follow a substantially circular travel path.

FIGURE 3 shows a top view of a preferred embodiment of inclining configurations for the cutting teeth of the present cutting strip 22. The cutting teeth comprise a plurality of pairs of transversely spaced cutting teeth integrally connected to the flat base portion 48. In order to provide superior cutting characteristics, the cutting teeth pairs may be longitudinally grouped along and bent relative to the base portion 48 in recurring series of four different inclining configurations.

A first inclining configuration is illustrated by the cutting teeth pair 54 and 56, wherein both of these cutting teeth are evenly substantially vertically inclined to the base portion 48. In practice, it has been found that a base portion 48 having a width of about .232 inch in combination with an outward spacing of about .168 inch from the top of the cutting tooth 54 to the top of cutting tooth 56 provides excellent cutting characteristics.

A second inclining configuration is illustrated by the positions of the cutting teeth pair 58 and 60, wherein each of the cutting teeth are evenly transversely inclined to the base portion 48 by a greater amount than the first inclining configuration of cutting teeth 54 and 56. In practice, a spacing of about .336 inch from the top of cutting tooth 58 to the top of cutting tooth 60 has been advantageously utilized.

In the third inclining configuration illustrated by the position of cutting teeth 62 and 64, the cutting tooth 64 is inclined more so on a first side of the base portion 48 than the cutting tooth 62 of the teeth pair. In practice, the cutting tooth 64 is bent to a position slightly past the center line of the flat base 48, while the cutting tooth 62 is inclined only slightly more outwardly than the cutting tooth 54.

The fourth inclining cutting teeth configuration of the present invention is illustrated by the positions of cutting teeth 66 and 68. The cutting tooth 66 is inclined more so on a second side of the base portion 48 than cutting tooth 68. The configuration of cutting teeth 66 and 68 is opposite the configuration of cutting teeth 62 and 64, with the top of cutting tooth 66 being bent just slightly past the center of the flat base portion 48. The inclination of cutting tooth 68 to the flat base 48 is only slightly more outwardly inclined than the cutting tooth 56 previously described.

The continuous cutting strip 22 may be constructed from a single piece of low carbon, SAE 1030–1050 steel that has been Austempered and cyanide hardened. Carbon may be added to the surface of the strip so that Austempering will yield an improved hardened cutting edge. Alternatively, the top of the stamped out cutting strip may be copper masked before cyanide hardening in order to provide harder surfaces on the inside of the guide members and on the outside of the cutting teeth.

The ends of the present cutting strip 22 may be easily joined during manufacture or repaired upon breaking. For instance, a Thermite process may be used to join the ends of the strip. Alternatively, the ends of the strip may be secured together by electric fusion welding, by butt welding, or by brazing with a short overlap.

Although recurring series of four different inclining configurations are illustrated, it will be understood that recurring series of more or less than four inclining configurations may also be advantageously utilized. Further, a cutting strip constructed in accordance with the previously discussed United States Patent 3,338,275 may be utilized with the present saw. With the provision of the present cutting teeth inclining configurations, it has been found that the continuous cutting strip 22 is less likely to bind in the material being cut. Further, a cutting strip constructed in accordance with this invention does not tend to retain or to carry substantial amounts of foreign material between adjacent cutting teeth during cutting and thus stretching of the cutting strip is reduced. Also, due to the open space between the transversely spaced cutting teeth and due to the continuous surface provided by the flat base 48, the cutting strip of the present invention provides a smooth outward flow of chips during the cutting operation.

Referring now to FIGURE 4, wherein like reference numerals refer to like and corresponding parts previously described, the driving mechanism for the cutting strip 22 is illustrated in greater detail. The drive sprocket wheel 24 rotates in a counterclockwise direction and includes a plurality of radially outwardly extending sprockets 70 for drivingly engaging the driving surfaces 52 of the cutting teeth 44. In the preferred embodiment the sprocket wheel 24 was constructed with a width of about .375 inch and an outside diameter of about 2.14 inches, sprocket to sprocket.

Each sprocket 70 contacts a cutting tooth near the junction of the cutting tooth with the flat base portion 48 of the cutting strip 22, but the sprockets 70 are so dimensioned to leave a small clearance between the end of the sprocket and the flat base portion 48. As the sprocket wheel 24 is rotated, a sprocket 70 moves upwardly from the base of a cutting tooth driving surface 52 to propel the cutting strip 22 forward. Just as the cutting tooth contacting sprocket clears the top of the cutting tooth, the next sprocket 70 contacts the base of the next cutting tooth to provide a continuous drive of the cutting strip 22. It should be noted that although the preferred embodiment illustrates a rotating drive wheel disposed outside the periphery of the flexible cutting strip 22, the drive wheel could be disposed inside the periphery of the strip and drivingly contact the guide members.

The slope of the cutting teeth driving surfaces 52 causes the force vectors provided by the sprockets 70 on the driving surfaces 52 to be so directed as to push the cutting strip 22 against the outside periphery of the support member 20 to provide a positive drive of the cutting strip. By varying the slope of the cutting teeth driving surfaces 52, the direction of the force vectors of the sprockets 70 may be changed, thus also changing the magnitude of the driving tension placed upon the cutting strip 22. Further, because the sprocket wheel 24 is disposed outside the periphery of the rotating cutting strip 22, a continuous drive is maintained against the cutting strip even upon the occurrence of substantial cutting forces. The present driving mechanism for the circular saw does not tend to bend or kink the cutting strip 22 when the cutting teeth become bound or locked into the material being cut. The uniform drive provided by the driving sprocket wheel reduces wear and bending loads on the cutting strip to allow the use of thinner band steel. As previously discussed, the substantially circular and continuous travel path provided by the support member 20 reduces flexing of and thus provides a longer life for the cutting strip 22.

Figure 7:
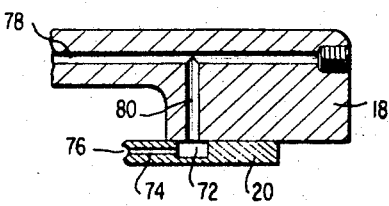
FIGURE 7 is a cross-sectional view of a portion of the lubrication system of the present invention taken along lines 7—7 of FIGURE 4.

To further reduce frictional losses, lubricant may be supplied between the support member 20 and the cutting strip 22. A constant flow of lubricant may be conventionally supplied to a chamber 72 (FIGURES 4 and 7) and then through a passage 74 to a circumferential groove 76 disposed around the support member 20. Due to the rotary motion of the cutting strip 22 and pressure supplied to the lubricant, a thin film of lubricant is disposed about the periphery of the support member 20 in order to substantially reduce frictional losses of the saw. As shown in greater detail in FIGURE 7, the lubricant may be supplied by a conventional pump arrangement through channels 78 and 80 into the lubricant chamber 72.

Figure 5:
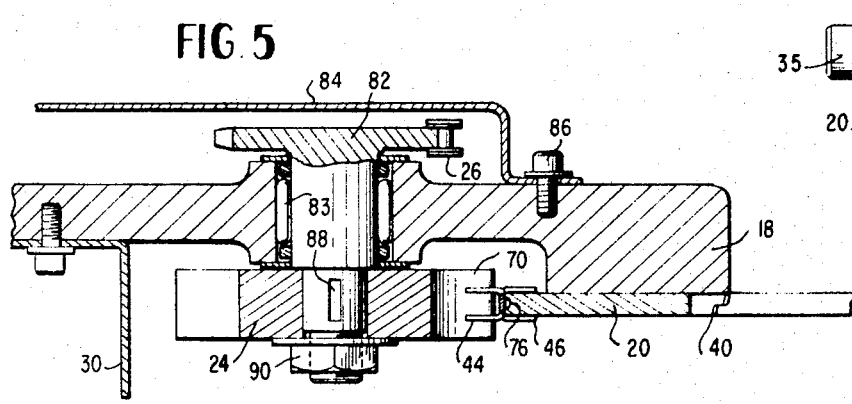
FIGURE 5 is a cross-sectional view of the driving mechanism taken along the line 5—5 of FIGURE 4.

Referring to FIGURES 4 and 5, the internal construction of the drive mechanism for the sprocket wheel 24 is illustrated. Portions of the drive belt or chain 26 engage with teeth of a drive wheel 82 which is journaled in the support extension 18 by suitable bearing members 83. A guard housing 84 is connected to the extension 18 by suitable screws 86 and is disposed over the wheel 82 for safety. The drive wheel 82 fits through the sprocket wheel 24 and is connected to rotate the wheel 24 by a key member 88. A suitable fastening nut 90 is provided to suitably tension the sprocket wheel 24 on the rotating drive wheel 82. As previously described, the guide members 46 encompass portions of the periphery of the support member 20 to constrain the cutting strip 22 to follow a circular travel path.

Figure 6:
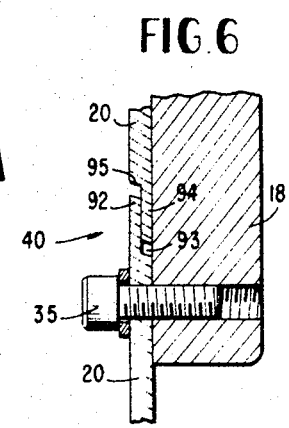
FIGURE 6 is a cross-sectional view of the support adjustment taken along lines 6—6 of FIGURE 4.

FIGURES 4 and 6 clearly illustrate the interlocking expansion joint 40, which is located below the contact point of the spocket wheel 24 with the cutting strip 22 in order to prevent undue stress upon the expansion joint. One end of the split circular support member 20 is firmly connected to the support extension 18 by a suitable fastening device 35. This fixed end of the circular support member 20 is provided with an extension 92 which defines a slot portion 93. The adjustable end of the split support member 20 includes a mating extension 94 which closely fits into slot portion 93 and which defines a slot portion 95 for matingly receiving extension 92. The ends of the extensions 92 and 94 are beveled, and the slot portions 93 and 95 have beveled shoulders to mate with the extension ends when the joint is fully interlocked. By selecting positioning of the screw 36 in the elongated slot 38, the magnitude of the outer periphery of the circular support member 20 may thus be adjusted in magnitude in order to select the desired tension for the cutting strip 22, while maintaining a substantially continuous circular travel path. A spring may be disposed in the slot 38 to provide continuous tension to the adjustable end of the support member 20.

From the foregoing detailed description, it will be apparent that a power saw constructed in accordance with the present invention provides substantial advantages over power saws heretofore developed. For instance, the relatively flexible continuous cutting strip of the present invention may be very economically manufactured and may thus be thrown away when dull without necessitating time consuming sharpening. Because of its low intertia, the present saw may be virtually instantaneously stopped. The present cutting strip does not stretch even with substantial use and provides a smooth outward flow of chips during the cutting operation.

As is apparent from the cross-sectional illustration of the guide bar 20 and cutting strip 22 presented in FIGURE 5, and the overall arrangement of these components as shown in FIGURE 1, the guide bar or rigid means 20 is fully operable to follow the flat base or support means 48 of the strip 22, as the strip 22 moves into a kerf cut by cutting teeth 44.

As will also be apparent, in view of the foregoing discussion and the appended drawings, the various cutting teeth 44 are connected to the base 48 by connecting sheet metal portions 44a. These connecting portions 44a, as illustrated and described, are integral portions of the strip 22 and are supported immediately adjacent the guide bar 20 for substantially non-flexing movement through the circular travel path defined by the guide bar periphery.

Additionally, a power saw constructed in accordance with the present invention eliminates flexing of the continuous cutting strip and thus provides a longer life of the saw because of low frictional losses and low heat generation. The present saw is extremely easy to lubricate, and in fact requires less lubrication because of its novel method of construction and operation. Because of the provision of the novel expansion joint of the circular support member, tension on the cutting strip may be selectively adjusted while maintaining a continuous travel path for the cutting strip.

It will be understood that while a preferred embodiment has been described, the invention should not be limited to the exact method or apparatus illustrated, as various modifications which do not depart from the essence of the invention will be obvious to those skilled in the art.

What is claimed is:

1. A power driven saw comprising:
   rigid means defining a substantially circular and continuous travel path;
   a radially flexible continuous cutting strip disposed in the travel path for rotation therethrough;
   said cutting strip having a relatively flat base with integral cutting teeth being bent transversely of the base, and
   said flat base and cutting teeth comprising integral portions formed from unitary sheet metal strip means;
   said rigid means being disposed in supporting engagement with said flat base of said cutting strip and operable to follow said cutting strip into a kerf cut by said cutting teeth; and
   driving means for rotating said cutting strip through the travel path.

2. A portable saw comprising:
   rigid means defining a substantially circular and continuous travel path, said rigid means having external side portions spaced axially of said travel path;
   a generally circular, continuous cutting strip disposed in said travel path for rotatable movement about said rigid means and for substantially nonflexing rotation through said travel path;
   said cutting strip including
      sheet metal, support means mounted on said rigid means for rotation thereabout, extending transversely of said rigid means, and disposed radially outwardly but adjacent to said rigid means;
      a first plurality of sheet metal-defining cutting teeth extending transversely of said sheet metal support means and generally aligned along one portion of said circular travel path,
      a second plurality of sheet metal-defined cutting teeth extending transversely of said support means and generally aligned along another portion of said circular travel path and spaced radially from said first travel path portion,
      sheet metal connecting portions between each tooth of said first and second plurality of sheet metal-defined cutting teeth and said support means, said connecting portions being supported immediately adjacent said rigid means and mounted for substantially nonflexing movement through said circular travel path, and
      sheet metal guide means extending transversely of said support means and slidably engaging said external side portions of said rigid means to constrain said strip to travel through said travel path,
      said support means, first plurality of cutting teeth, second plurality of cutting teeth, guide means, and connecting portions comprising integral portions formed from unitary sheet metal strip means;
   said rigid means being disposed in supporting engagement with said support means of said cutting strip and operable to follow said support means into a kerf cut by said first and second plurality of cutting teeth; and
   driving means engaged with said cutting strip and operable to rotate said cutting strip about said rigid means.

3. A portable saw comprising:
   rigid means defining a substantially circular travel path;
   a generally circular, continuous cutting strip disposed in said travel path for rotatable movement about said rigid means and for substantially nonflexing rotation through said travel path;
   said cutting strip including
      sheet metal, support means mounted on said rigid means for rotation thereabout, extending transversely of said rigid means, and disposed radially outwardly but adjacent to said rigid means,
      a plurality of sheet metal-defined, cutting teeth extending transversely of said sheet metal support means and generally aligned along said circular travel path,
      sheet metal connecting portions between each tooth of said plurality of sheet metal-defined cutting teeth and said support means, said connecting portions being supported immediately adjacent said rigid means and mounted for substantially nonflexing movement through said circular travel path; and
      sheet metal guide means extending transversely of said support means, and slidably engaging said rigid means to constrain said strip to travel through said path,
      said support means, plurality of cutting teeth, guide means, and connecting portions comprising integral portions formed from unitary sheet metal strip means;
   said rigid means being disposed in supporting engagement with said support means of said cutting strip and operable to follow said support means into a kerf cut by said plurality of cutting teeth; and
   driving means engaged with said cutting strip and operable to rotate said cutting strip about said rigid means.

4. A power driven saw comprising:
   means defining a substantially circular travel path;
   a continuous cutting means disposed in said travel path for substantially nonflexing rotation therethrough;
   said cutting means having flexible base means with cutting teeth means mounted thereon,
      said flexible base means and cutting teeth means comprising unitary portions of sheet metal means;
   said means defining a substantially circular travel path being disposed in supporting engagement with said flexible base means of said cutting means and operable to follow said cutting means into a kerf by said cutting teeth; and
   driving means for rotating said cutting means through said travel path.

5. A power driven saw as described in claim 1 further comprising:
   circumferentially overlapping portions of said rigid means disposed in axially continguous relation; and
   selectively operable means operable to induce relative circumferential movement between said overlapping portions and maintain said overlapping portions in axially continguous relation.

6. A power driven saw as described in claim 1 further comprising:
   a first series of circumferentially spaced driving surfaces formed by said cutting teeth generally along one side of said cutting strip;
   a second series of circumferentially spaced driving surfaces formed by said cutting teeth generally along another side of said cutting strip; and
   rotary means included in said driving means and operable to drivingly engage said first and second series of driving surfaces.

7. A power driven saw as described in claim 1 wherein said cutting teeth comprise:
   a plurality of circumferentially spaced pairs of individual cutting teeth;

the individual cutting teeth in each pair of cutting teeth being generally axially displaced with respect to said travel path;

the axial distance between the individual cutting teeth of said pairs of cutting teeth varying, on a repeated cyclic basis, circumferentially about said cutting strip.

8. A power driven saw as described in claim 1 further comprising:

circumferentially overlapping portions of said rigid means disposed in axially contiguous relation;

selectively operable means operable to induce relative circumferential movement between said overlapping portions and maintain said overlapping portions in axially contiguous relation;

a first series of circumferentially spaced driving surfaces formed by said cutting teeth generally along one side of said cutting strip;

a second series of circumferentially spaced driving surfaces formed by said cutting teeth generally along another side of said cutting strip;

rotary means included in said driving means and operable to drivingly engage said first and second series of driving surface; and a plurality of circumferentially spaced pairs of individual cutting teeth included in said cutting teeth of said cutting strip;

the individual cutting teeth in each pair of cutting teeth being generally axially displaced with respect to said travel path; and the axial distance between the individual cutting teeth of said pairs of cutting teeth varying on a repeated cyclic basis circumferentially about said cutting strip.

References Cited

UNITED STATES PATENTS

| 2,351,738 | 6/1944 | Blum | 143—135 |
| 2,804,105 | 8/1957 | Stone | 143—44 |
| 3,135,304 | 6/1964 | Breer et al. | 143—44 |
| 3,338,275 | 8/1967 | Ehlen | 143—32 |

FOREIGN PATENTS

| 396,208 | 1/1909 | France. |

DONALD R. SCHRAN, Primary Examiner

U.S. Cl. X.R.

143—32, 135